P. & P. J. SCHMITT.
Grain Drill.
No. 54,219.
Patented Apr. 24, 1866.
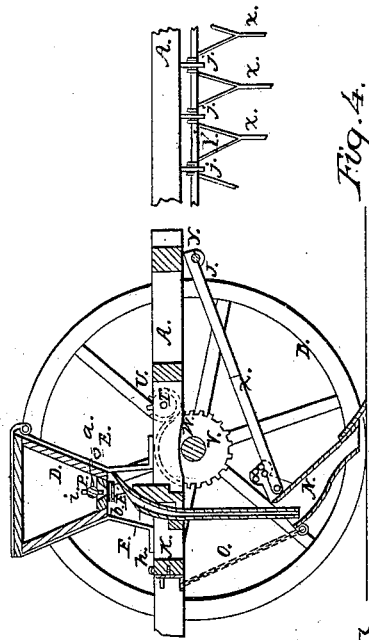
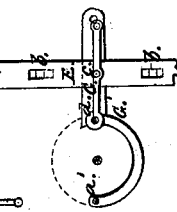
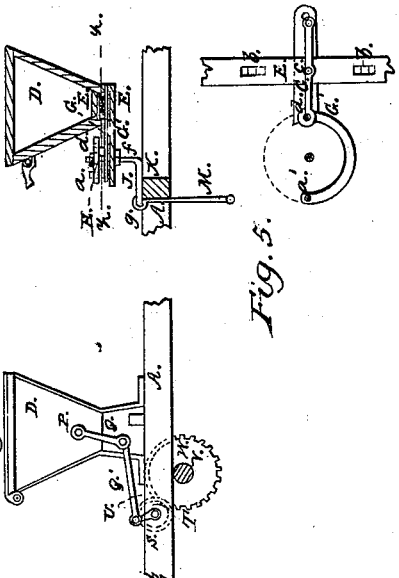
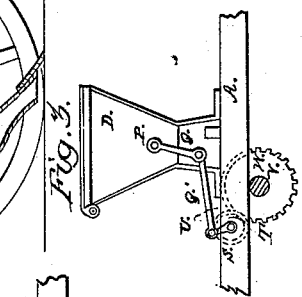
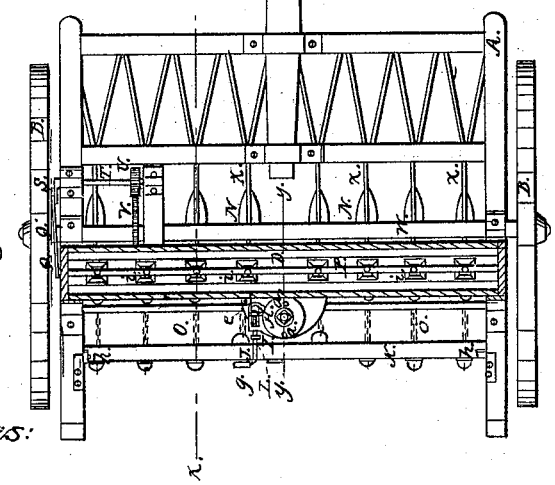
Witnesses:
Inventor:

UNITED STATES PATENT OFFICE.

PETER SCHMITT AND PETER JACOB SCHMITT, OF WATERLOO, ILLINOIS.

IMPROVEMENT IN GRAIN-DRILLS.

Specification forming part of Letters Patent No. 54,219, dated April 24, 1866.

*To all whom it may concern:*

Be it known that we, PETER SCHMITT and PETER JACOB SCHMITT, of Waterloo, in the county of Monroe and State of Illinois, have invented a new and Improved Grain-Drill; and we do hereby declare that the following is a full, clear, and exact description thereof, which will enable those skilled in the art to make and use the same, reference being had to the accompanying drawings, forming part of this specification, in which—

Figure 1 is a plan or top view of our invention; Fig. 2, a side sectional view of the same, taken in the line *x x*, Fig. 1; Fig. 3, a side view of a portion of the same; Fig. 4, a vertical section of a portion of the same, taken in the line *y y*, Fig. 1; Fig. 5, a horizontal section of Fig. 4, taken in the line *z z*.

Similar letters of reference indicate corresponding parts.

This invention relates to a new and useful improvement in the feed mechanism of grain-drills, whereby the discharge-holes from the seed-box may be adjusted to any size to suit any kind of grain or grass-seeds without emptying the grain-box.

The invention also relates to a new and improved means for operating the riddle or clearing-bar within the seed-box; and, further, in an improved manner of attaching the shoe-hangers to the machine, the advantages of which will be hereinafter fully set forth.

A represents a rectangular frame, which is mounted on two wheels, B B, and has a draft-pole, C, attached to it, and D is a seed-box placed on the frame A and extending its whole width. The bottom of this seed-box is perforated with holes *a* at suitable and equal distances apart, and underneath the seed-box there are placed two longitudinal bars, E E', one above the other, and each perforated with holes *b*. These bars E E' are allowed to slide in a longitudinal direction in order to form a register, so that the capacity of the holes *b* may be varied to suit any kind or size of grain or grass-seed, the bars, of course, being moved in opposite directions and both moved simultaneously, so that the holes *b*, whether enlarged or contracted, will always be over the centers of the funnels F, which conduct the seed into the shoes. These bars E E' are moved or adjusted as follows: The upper bar, E, has a lever, G, secured to it by a pivot, *c*, and the lower bar, E', has a lever, G', pivoted to it. Each of these levers is provided with a vertical pin, *d*, and these pins are fitted in a horizontal wheel, H, at opposite sides of its center or axis, said wheel being at the rear side of the seed-box and provided with an arm, I, having an oblong slot, *e*, in it to receive an upright pin, *f*, at one end of a bar, J, the opposite end of said bar being secured, by a joint, *g*, to the shoe-lifting bar K, which works on pivots *h* at the rear of the frame A, and may be arranged in the usual way. Into this arm I an adjoining screw, L, passes horizontally. The shoe-lifting bar K has a handle or lever, M, attached to it.

The shoes N, which may be of usual construction, are connected to the bar K by chains O; and it will be seen from the above description that by raising the shoes N, which is done by turning the bar K upward, the bar J will actuate or turn the wheel H and the bars E E' moved in opposite directions through the medium of the levers G G', and by this movement of the bars E E' the discharge of seed from the seed-box will be cut off, the bars being moved in the opposite direction, when the bar K is lowered or turned down and the seed again allowed to be discharged from the seed-box. This arrangement is an important one, for whenever the shoes are raised the flow of seed should be stopped, and this, it will be seen, is done automatically by our invention.

In order to regulate the amount of seed to be sown over a given area, the bars E E' are adjusted by means of the screw L, which actuates the wheel H, the inner end of said screw bearing against the pin *f* of bar J. This regulating of the bars E E' may be effected at any time by the driver walking behind it, who can observe the dropping of the seed and see whether the flow or discharge should be increased or diminished. The feed, therefore, is under the complete control of the driver, who can manipulate it with one hand.

Within the seed-box D there is placed longitudinally a shaft, P, provided with arms *i*. This shaft is near the bottom of the seed-box, and it passes through one side of the same, and has an arm, Q, extending down from it, which is connected, by a pitman, Q, with a crank, S, at one end of a shaft, T, which has a pinion, U, upon it. Into this pinion U a toothed wheel, V, on the axle W of the machine gears. By this arrangement it will be seen that as the machine is drawn along a reciprocating circular motion will be given the shaft P, and with but a few parts, and consequently with but little friction and little wear and tear.

X represents the shoe-hangers or rods, the front ends of which are notched and are fitted on a rod, Y, which is secured to the under side of the front cross-bar of frame A by hooks $j$. By this arrangement the hangers are allowed to work freely on said rod, and are prevented, when in a working position, from being casually detached; but by detaching the chains O from the shoes and elevating the front part of the machine, so that the hangers or rods X may be turned down to a vertical position, they may be readily slipped off from the rod Y for repairs, &c., and also readily adjusted in place.

Having thus described our invention, we claim as new and desire to secure by Letters Patent—

1. The two perforated plates E E', with levers G G' attached, in connection with the wheel H, provided with the arm I, regulating or adjusting screw L, and the bar J, connected with the shoe-lifting bar K, all arranged to operate in the manner substantially as and for the purpose set forth.

2. The attaching of the shoe-hangers X to the front part of the frame A by having said hangers notched at their front ends and fitted on a rod, Y, which is secured to the under side of the front bar of the frame A by hooks $j$, substantially as shown and described.

PETER SCHMITT.
    PETER JACOB SCHMITT.

Witnesses:
    CHARLES HENCKLER,
    H. C. TALBOTT.